United States Patent [19]

Novotny et al.

[11] 4,043,905
[45] Aug. 23, 1977

[54] CHROMATOGRAPHIC SEPARATION COLUMNS WITH SELECTIVELY MODIFIED ACTIVE SURFACES AND METHODS FOR THEIR PREPARATIONS

[75] Inventors: Milos V Novotny, Bloomington, Ind.; Karel Grohmann, Pasadena, Calif.

[73] Assignee: Indiana University Foundation, Bloomington, Ind.

[21] Appl. No.: 500,226

[22] Filed: Aug. 26, 1974

[51] Int. Cl.$^2$ ............................................. B01D 15/08
[52] U.S. Cl. ................................... 210/31 C; 55/386; 210/198 C
[58] Field of Search ............... 210/24 C, 198 C, 31 C; 55/67, 386; 252/428; 427/333, 337, 340, 402, 215

[56] References Cited
U.S. PATENT DOCUMENTS

| | | | |
|---|---|---|---|
| 3,116,161 | 12/1963 | Purnell | 55/36 X |
| 3,666,530 | 5/1972 | Aue et al. | 427/402 X |
| 3,808,125 | 4/1974 | Good | 55/386 X |
| 3,869,409 | 3/1973 | Bebais et al. | 210/24 C |
| 3,922,392 | 11/1975 | Kohlschutter et al. | 55/386 X |
| 3,954,651 | 5/1976 | Donike | 55/67 X |

Primary Examiner—John Adee
Attorney, Agent, or Firm—Kirkland & Ellis

[57] ABSTRACT

Selective monomolecular layers on siliceous surfaces used for the construction of high-resolution chromatographic columns are prepared by surface reactions with monohalogenated silanes, silazanes or silylamines, or monoalkoxy- or monoacetoxysilanes, and subsequent chemical modifications. Such monolayers form a basis for efficient films of chemically compatible stationary phases by introducing selective groups in gas-liquid chromatography and all forms of liquid chromatography, or for adsorbent modifications in gas-solid chromatography.

4 Claims, 2 Drawing Figures

CHROMATOGRAPHIC SEPARATION COLUMNS WITH SELECTIVELY MODIFIED ACTIVE SURFACES AND METHODS FOR THEIR PREPARATIONS

BACKGROUND OF THE INVENTION

This invention relates to all forms of chromatography, e.g., liquid, gas-liquid and gas-solid, which use separation columns having at least their active surfaces made of glass or other siliceous material. The invention also relates to methods for preparing the separation columns, which include capillary (open) columns and support-coated open tubular (SCOT) columns as well as packed columns of all sorts. (As employed throughout the following description and claims, the expression "active surfaces" refers to those surfaces of the column, including the packing material in the case of packed columns, which carry the stationary phase effecting the chromatographic separation or partitioning process.) For additional information as to both capillary (sometimes referred to as open tubular or Golay) columns, as well as to SCOT and packed columns, reference may be had to respective U.S. Pat. Nos. 2,290,478 to Marcel J. E. Golay; and 3,295,296 and 3,340,085 to I. Halasz and C. Horvath.

Glass has often been considered as a preferred material for the construction of chromatographic columns, particularly capillary and SCOT columns, for reasons of its low catalytic activity toward unstable samples such as steroid derivatives, polar aroma-generating consitutents and certain drug metabolities. Additional advantages of glass columns include the relative ease of the preparation of the tubing and the often greater reproducibility afforded the preparation of high-efficiency chromatographic columns.

In order to obtain columns of high separating power, a regular homogeneous film of the stationary phase must be deposited on the entire surface, e.g., along the entire length of the inner surface of a capillary tube. In general, this is difficult to accomplish with ordinary glass surfaces due to their high surface energies and, consequently, the large contact angles exhibited by most organic liquids. Surface treatment procedures such as carbonization or corrosion with both aqueous and gaseous etching media have been suggested to decrease the values of contact angles. However, in order to achieve homogeneous and stable films of different stationary phases, the chemical capatibility of glass surface and the stationary liquid is an important additional factor. In the case of nonpolar stationary liquids, such as hydrocarbons and certain methylsilicone fluids or gums, this condition is met after the reaction of glass surface silanol groups with common silylation agents such as hexamethyldisilazane and trimethylchlorosilane [M. Novotny and K. Tesarik, Chromatographia 1, 332 (1968)]. Stationary phases of different polarity are, however, needed in a number of practical analytical problems.

In U.S. Pat. No. 3,515,923 there is described the preparation of glass column active surfaces by utilization of hydrolytic polymeric products of di- and trihalogenated silanes, di- and trialkoxyorganosilanes and di- and triacetoryorganosilanes as direct separation media (also called chemically-bonded stationary phases) without further chemical modification and wetting with a partitioning liquid.

SUMMARY OF THE INVENTION

It has been discovered that improved chromatographic columns of high efficiency can be obtained when the siliceous surfaces to be coated with a stationary phase are first modified to form monomolecular layers compatible with the properties of given stationary phases. Monomolecular layers appropriate to different phases can be prepared by the reaction of siliceous surfaces with selected silane compounds which possess selective groups in their side chain, or where such groups can be chemically generated in a subsequent step. The formation of such monolayers brings about more regular spreading of stationary phase films in gas-liquid chromatography or desirable alterations in the properties of the adsorbents used in gas-solid chromatography, or desirable alterations in materials used in all forms of liquid chromatography.

According to the present invention, monomolecular selective layers are attached to the silica surface via Si-O-Si-C bonds which are considerably more stable, hydrolytically and thermally, than those involved in adsorbent modifications described such as esterification (formation of Si-O-C bonds). In addition, suface silylation followed by a selective modification as hereinafter described is necessary as a method for the deactivation of the adsorptive (unmodified) surface when small concentrations (nanogram quantities and less) of unstable compounds are chromatographed.

The present invention contemplates chromatography columns having "tailor-made" monomolecular layers of variable polarity, on glass or other siliceous active surfaces, which provide a stable, mechanically and chemically-compatible basis for the deposition of polar-stationary-phase films on the active surfaces of the columns. The monomolecular layers are formed by chemical reaction of silanol groups present on glass, other siliceous material as diatomaceous earth or quartz, or any other material which may so react, with monohalogenated silanes, silazanes or silylamines, or monoalkoxy- or monoacetoxysilanes, to create the monomolecular layer on the surface of the material without polymerization and formation of polysiloxanes. The silanes of such structures are chosen so that further chemical modifications in the side chain of the silane compounds can be made after their attachment to the silica framework. These modifications include a variety of chemical reactions to create surfaces with selective properties and affinities to different stationary liquids which can, consequently, be coated on the surfaces as homogeneous and regular films.

The selective momomolecular layers on siliceous surfaces hereinafter more particularly described are applicable to the preparation of SCOT columns, containing either small particles of diatomaceous earths or silica, or colloidal coatings, deposited on the inside of either glass or metal tubes as well as to packed columns and so-called packed capillaries or micro-packed columns, packed with either glass beads, porous silica materials, diatomaceous earths, or any other material which can be reacted with the said silane compounds.

This method is applicable to gas-liquid chromatography in providing a chemically compatible surface for the coating of polar stationary phases on either unmodified surfaces or those previously treated in any chemical or mechanical way. It is also applicable to columns and packing materials for gas-solid chromatography and all forms of liquid chromatography in providing a monomolecular layer on surfaces of adsorbents, both deposited on the walls or packed into the tubes, so as to alter their selectivity.

DESCRIPTION OF THE PREFERRED EMBODIMENTS

Figure 1:
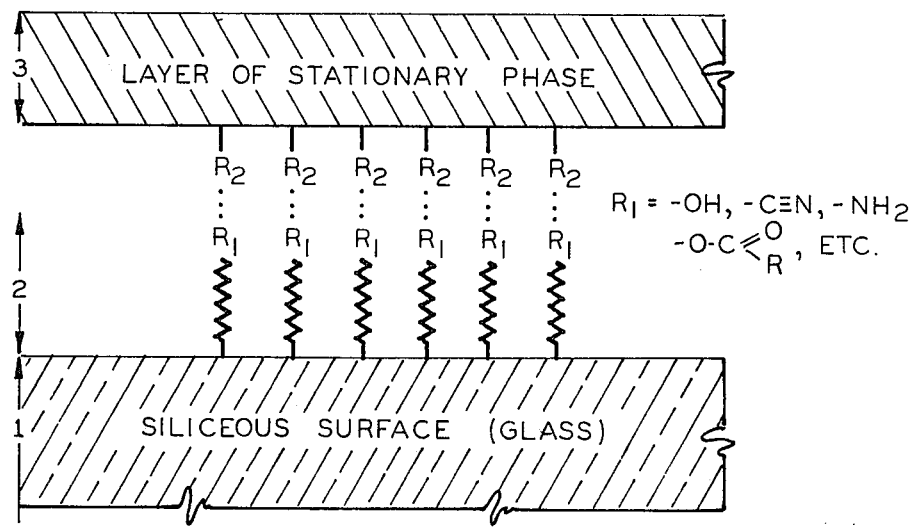
FIG. 1 is a diagrammatic representation of the bonding of a monomolecular layer to a siliceous surface in accordance with the present invention.

Referring now to the drawings and first in particular to FIG. 1, a siliceous surface 1, (which may be the inner wall of a glass separating column or the surface of a packing material, for example) has a monomolecular layer 2 chemically attached thereto via Si-O-Si-C bonds.

$R_1$ is a functional group which is either present in the molecule of the modifying substance before attachment to the siliceous surface 1, or which can be generated chemically after such attachment. $R_1$ is introduced into the surface structure to interact with the moieties $R_2$ of the stationary liquid or solid phase 3, or any other property of such a liquid or solid which is either mechanically deposited on the modified surface or deposited and reacted with such surface structures.

$R_1$ may also be introduced in this monomolecular layer to provide groups which selectively interact with chromatographed solutes in gas/solid chromatography and all forms of liquid chromatography.

Figure 2:
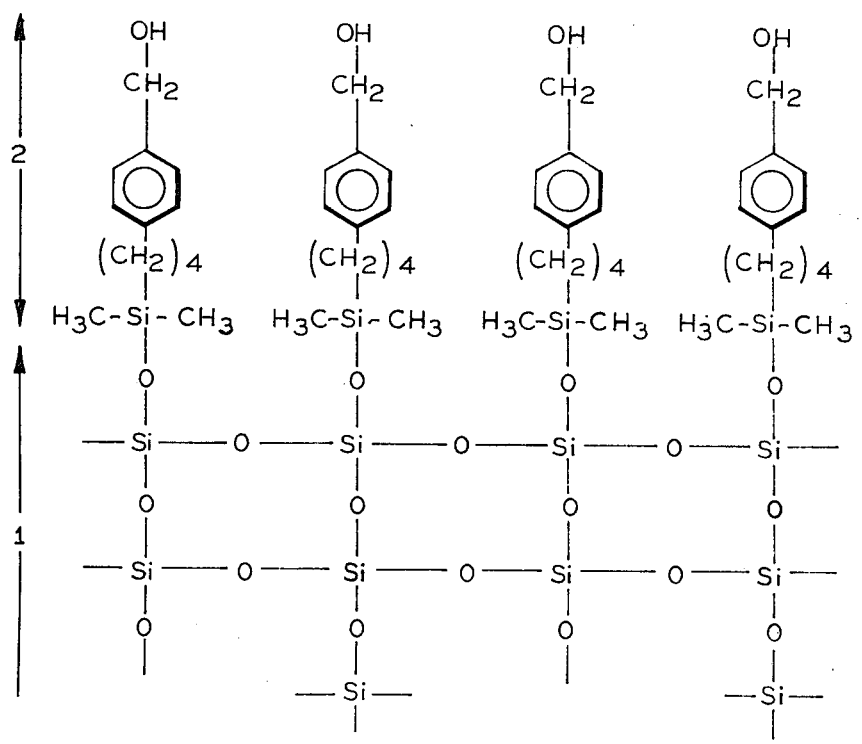
FIG. 2 is a diagrammatic representation of a specific example of bonding shown generally in FIG. 1.

FIG. 2 is a special example of FIG. 1, where the siliceous surface 1 is reacted with chlorodimethyl-[4-(4-chloromethylphenyl)butyl] silane to form the monomolecular layer 2 which is further modified by the hydrolysis of terminal chlorine groups to form the surface structures shown. The modified surface becomes, consequently, wettable with a polar liquid which is structurally compatible with the monomolecular layer. The surface designated 1 can be siliceous or any other surface which can react with monohalogenated silanes, silazanes or silylamines, or monoalkoxy- or monoacetoxylsilanes, and the surface may be either regular (e.g., the inner wall of glass capillary or a spherical glass bead) or irregular (diatomaceous earth, dispersed silica, etc.).

In preparation of columns and packings in accordance with this invention, the siliceous active surface reacted with solutions of monohalogenated silanes, silazanes or silylamines or monoalkoxy- or monoacetoxysilanes in appropriate solvents under appropriate conditions of temperature and reaction time as will be seen from specific examples which follow; the exact procedure is dependent on the type of reacted material, the identity of the modifying compounds, and the types of stationary phases to be used for the final preparation of the chromatographic column. In the fabrication of tubular columns, the tubes are filled under pressure or suction with the said silanes or the suspensions of support materials in such solutions. In the case of particles to be later packed into columns, the reactions and modifications are carried out in bulk solutions (e.g., under reflux). More volatile silanes can also be introduced in the gas phase into the reactive systems. In a similar fashion, all subsequent modifications are made. The reagents to modify the molecules attached to the surfaces, as shown in FIGS. 1 and 2, are either forced into or through tubular columns or mixed with the suspension of particulate packing materials and reacted.

Examples of such procedures are given below:

EXAMPLE 1

A glass capillary (25 meters × 0.35 mm, i.d.) is completely filled with a 5% solution of chlorodimethyl [4-(4-chloromethylphenyl)butyl] silane in dry benzene, both ends are plugged with a piece of silicone rubber and the column put into an oven to react at 70° C. In this way, a monomolecular layer with terminal chlorine atoms is created. After 12 hours, the liquid is forced out under pressure and the column washed with benzene, acetone and tetrahydrofuran and dried at 40° C for 3 hours. In order to introduce hydroxy groups into the side chains of the surface structure, the capillary is filled with a solution of sodium carbonate (2 g of $Na_2CO_3$ per liter) in a 1:1 (volume) mixture of tetrahydrofuran and water, and reacted with 8 hours at 40° C. The column is successively washed at room temperature with a mixture of tetrahydrofuran and water, tetrahydrofuran, acetone, ether and benzene and dried at 40° C for 3 hours. Capillary tubes with the inner surface modified in this way are wettable with polar liquids such as polyethylene and polypropylene glycols and polyesters, resulting in highly efficient chromatographic columns.

EXAMPLE 2

A glass capillary (70 meters × 0.5 mm, i.d.) which had been previously internally etched with dry hydrogen chloride (M. Novotny and K. Tesarik, Chromatographia 1, 332 (1968) is filled with a 5% solution of chlorodimethyl [4-(4-chloromethylphenyl)butyl] silane in dry benzene and treated in a manner identical to that described in Example 1 except for the final reaction of terminal chlorine atoms with potassium cyanide solution of the same concentration as sodium carbonate in Example 1 and dissolved in the same solvents. After successive washing with the same series of solvents and drying, the capillary tube can be coated with stationary phases containing cyano groups in their structures, such as cyanoethyl silicone or 2-cyanoethylether.

EXAMPLE 3

A glass capillary (20 meters × 0.2 mm, i.d.) is filled with a 5% solution of a 1:1 mixture of 1,3-di-(3-heptafluoroisopropoxypropyl) tetramethyldisilazane and (3-heptafluoroisopropoxypropyl) dimethylchlorosilane in benzene and reacted at 70° C in an identical manner to Examples 1 and 2, and washed and dried as above. The column is then filled with 0.1 M HCl in a 1:1 mixture of tetrahydrofuran and water, and reacted for 12 hours at room temperature. The liquid is purged out of the column and successive washings with water, tetrahydrofuran, acetone, ether and benzene are carried out. The column is dried at 40° C for 3 hours. The hydroxy monolayers prepared through the hydrolysis of the above silanes are now coatable with polypropylene glycol.

EXAMPLE 4

To prepare packing material for packed columns useful for liquid chromatography, a desired amount of irregular small-particle silica gel is mixed together with dry benzene in a flask, the mixture de-gased by vacuum and an amount of chlorodimethyl [4-(4-chloromethylphenyl)butyl] silane, which corresponds to a monolayer coverage of a given surface area is added. The mixture is reacted under continuous mild stirring at 40° C for 36 hours. After the completion of this reaction, the material is separately refluxed in benzene, acetone, tetrahydrofuran (10 hours each) and dried at 60° C in an oven. A solution of potassium cyanide in tetrahydrofuran and water (the same concentration as a applicable to Example 2) is added. The mixture is de-gased again. The benzylic chlorines of the attached monolayer are reacted with potassium cyanide at 40° C for 8 hours in order to introduce cyano groups into the monolayer.

4-(4-chlorophenyl)-1-butene [II] is transformed via a second Grignard reaction with formaldehyde into the corresponding hydroxy compound 4-(4-hydroxymethylphenyl)-1-butene [III].

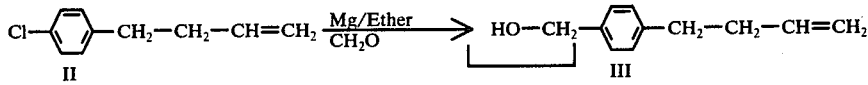

Step 3

The hydroxy compound [III] is converted into the corresponding chloro derivative with hydrogen chloride in the presence of anhydrous $Na_2SO_4$ (6 hours at room temperature).

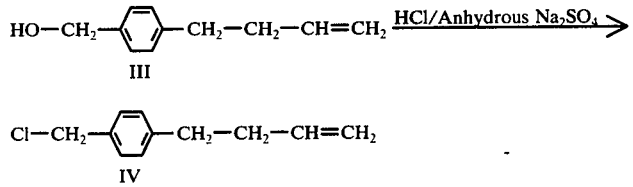

The final product is refluxed in the series of solvents (in a similar fashion to that described in Example 1), and dried at 70° C; the packing material is then ready for filling into a tube to form liquid chromatographic columns.

Step 4

Addition of this olefin [IV] to dimethylchlorosilane in the presence of hexachloroplatinic acid leads to the formation of dimethylchloro [(4-(4-chloromethylphenyl)butyl]silane [V].

EXAMPLE 5

To prepare an ion exchange packing for liquid chromatographic columns, an appropriate silica material is provided with a chlorodimethyl [4-(4-chloromethylphenyl)butyl] silyl monolayer as described in Example 4 above, and reacted further with a 1:1 mixture of trimethylamine and methanol at 0° C for 6 days. The moiety with ionic character is thus introduced into the surface monolayer structure in a fashion similar to that used for the preparation of conventional resinous anion exchangers. After an excessive washing with deionized water and equilibration with a buffer solution appropriate to a given analysis, the material is ready for column packing.

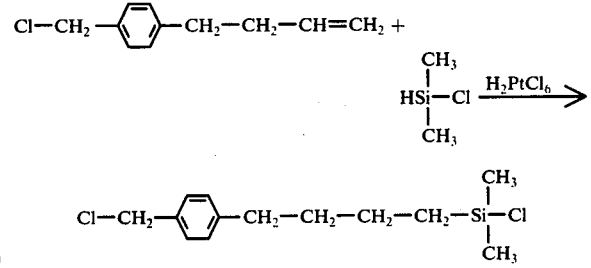

The synthesis and purification of the novel silanes employed in connection with the present invention is described in detail in a doctoral thesis by K. Grohmann entitled *Pellicular Silicone Resins as Solid Supports for Peptide Synthesis,* University of Houston, Houston, Texas, August 1972. By way of example, the generalized scheme for preparation of dimethylchloro [4-(4-chloromethylphenyl)butyl] silane, the monochloro silane utilized in preceding examples 1,2,4, and 5 is given below. Reference may be had to the Grohmann thesis for additional information.

Step 1

4-chlorobenzylchloride [I] is converted by a Wurtz synthesis with allybromide and magnesium into 4-(4-chlorophenyl)-1-butene [II].

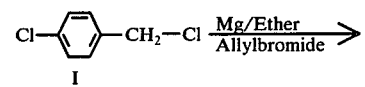

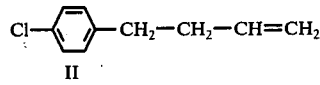

Step 2

While specific embodiments and examples of the invention have been described, it will be apparent to persons conversant with the art that various modifications may be made without departing from the essence of the invention, the scope of which is intended to be defined solely by the annexed claims.

What is claimed is:

1. A method of preparing chromotographic columns comprising active surfaces fabricated of a siliceous material which method includes the step of modifying said surfaces by reaction with chlorodimethyl (4-(4-chloromethylphenyl)butyl) silane.

2. A method according to claim 1 wherein the reaction is effected by heating for at least 30 minutes while the chlorodimethyl (4-(4-chloromethylphenyl) butyl silane and surface are in contact and is followed by flushing of the surface with solvents of different polarities and drying at a temperature above 41° C.

3. A method according to claim 2 including the further step of coating said surface with a solution to form a stationary phase for chromatographic separation.

4. A chromatographic column comprising active surfaces fabricated of siliceous material carrying a monomolecular layer thereon mechanically and chemically compatible with a stationary phase to be applied thereto, said layer being formed of chlorodimethyl (4-(4-chloromethylphenyl) butyl silane.

* * * * *